United States Patent
Repperger et al.

(10) Patent No.: US 7,030,808 B1
(45) Date of Patent: Apr. 18, 2006

(54) NONLINEAR TARGET RECOGNITION

(75) Inventors: Daniel W. Repperger, Dayton, OH (US); Eric M. Alderman, Gresham, OR (US); M. Seddik Djouadi, Knoxville, TN (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 239 days.

(21) Appl. No.: 10/794,547

(22) Filed: Mar. 5, 2004

(51) Int. Cl.
*G01S 7/292* (2006.01)

(52) U.S. Cl. ............... 342/159; 342/192; 342/196; 342/162; 342/90

(58) Field of Classification Search ........ 342/159–162, 342/192–196, 90–103, 189
See application file for complete search history.

(56) References Cited

U.S. PATENT DOCUMENTS

| | | | |
|---|---|---|---|
| 3,623,098 A * | 11/1971 | Jones et al. | 342/91 |
| 3,961,172 A * | 6/1976 | Hutcheon | 708/813 |
| 4,489,280 A * | 12/1984 | Bennett et al. | 327/46 |
| 5,630,425 A | 5/1997 | Panescu et al. | |
| H1720 H * | 4/1998 | Chen | 342/25 E |
| 6,208,963 B1 | 3/2001 | Martinez et al. | |
| 6,360,021 B1 * | 3/2002 | McCarthy et al. | 382/254 |
| 6,630,904 B1 | 10/2003 | Gustafson et al. | |
| 6,963,303 B1 * | 11/2005 | Beisner | 342/159 |

OTHER PUBLICATIONS

"Passive tracking of airborne targets using only Doppler and DOA information", Howland-P-E. IEE Colloquium 'Algorithms for Target Tracking' (Digest No. 1995/104), London, UK, May 16, 1995. In: p. 7/1-3.*

* cited by examiner

*Primary Examiner*—John B. Sotomayor
(74) *Attorney, Agent, or Firm*—AFMCLO/JAZ; Gina S. Tollefson; Gerald B. Hollins

(57) ABSTRACT

Nonlinear target detection for the detection of extremely weak signals when buried in very high levels of noise is performed with improvement of the quality of the signals received in the data by the amplification of the signal to noise (S/N) ratio. The S/N ratio increases dramatically after the originally measured signal is passed through a nonlinear stochastic resonance filter.

20 Claims, 9 Drawing Sheets

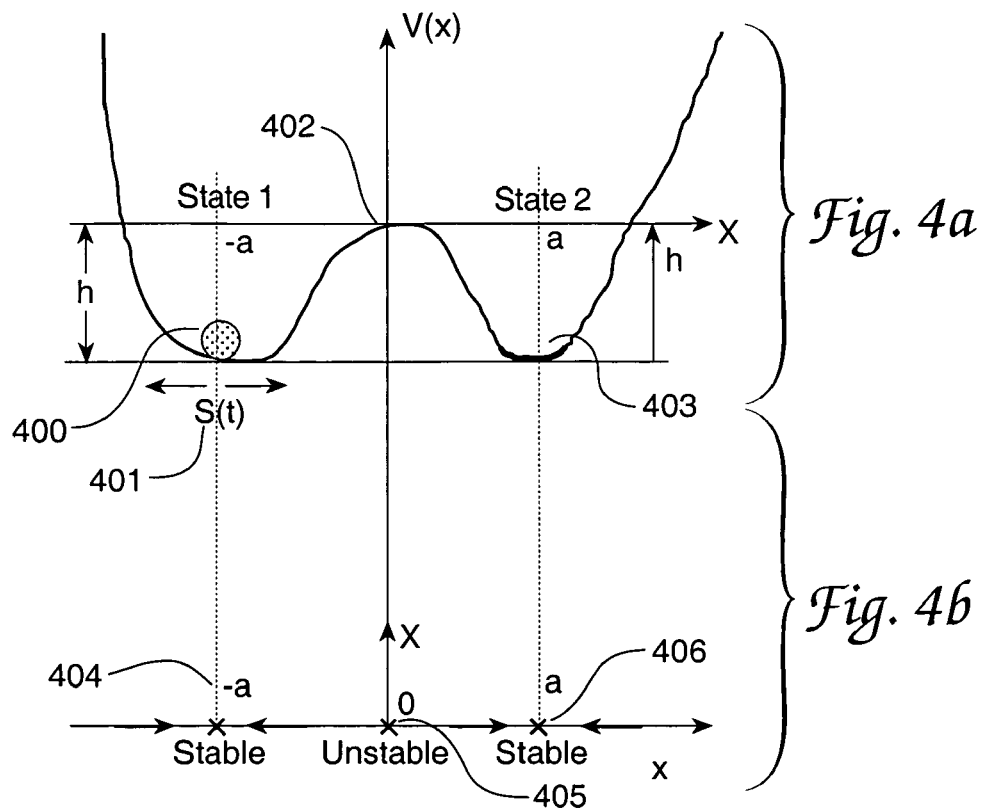
Fig. 4a
Fig. 4b
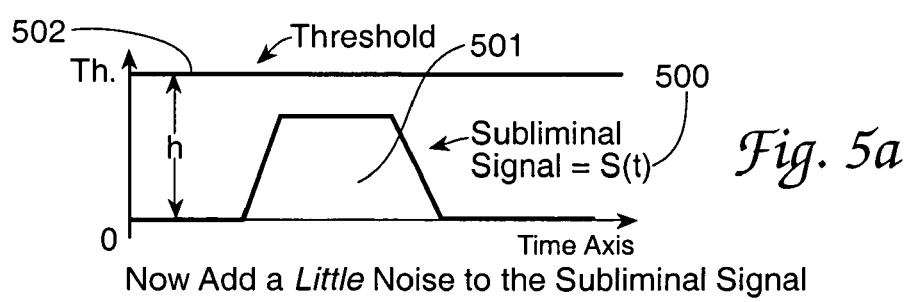
Fig. 5a
Now Add a *Little* Noise to the Subliminal Signal
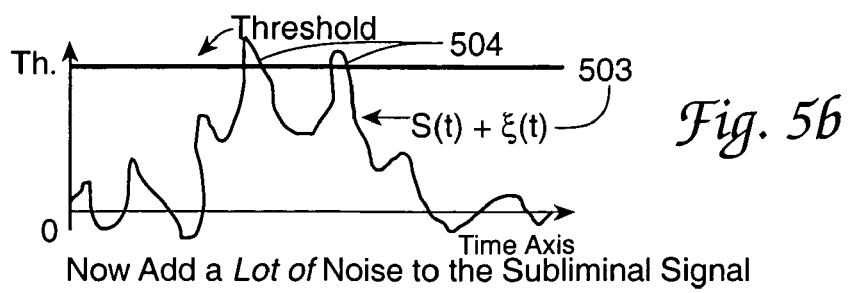
Fig. 5b
Now Add a *Lot of* Noise to the Subliminal Signal
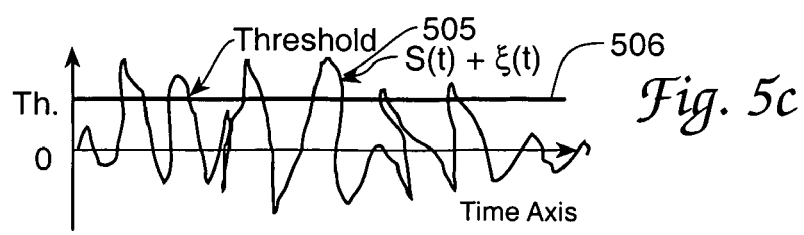
Fig. 5c

NONLINEAR TARGET RECOGNITION

RIGHTS OF THE GOVERNMENT

The invention described herein may be manufactured and used by or for the Government of the United States for all governmental purposes without the payment of any royalty.

BACKGROUND OF THE INVENTION

The present invention addresses the problem of identifying an enemy target by considering a signal containing high levels of noise. FIG. 1 illustrates generally the problem of target detection. A signal 100 is received by an operator, the signal 100 may contain information about a target and the signal may be encumbered by high levels of noise. Ideally, a target detection device 102 is designed to extract target information from the signal and communicate to the operator 103 that a target is or is not present.

An operator will select a target detection device based on the probability of accurate detection by the device and also, in the case of multiple targets, the probability of target differentiation by the device. In military applications, detection of multiple targets is a critical problem because it is necessary to clearly distinguish friendly objects from hostile threats.

FIG. 2 illustrates a prior art common type of target detector, which is based on linear system dynamics. In FIG. 2, the signal S(t) 200 represents the target signal (consisting of one or the sum of multiple sine waves) which is to be detected. The noise 201 added in the input data is modeled via a noise source η(t) which sums with S(t) at the left side of the target detection block at 202. The linear system processes these data and has an output (variable x) 203. In the variable x, 203, the ratio of the power in the signal of the target S(t) to the noise η(t) may be expressed in terms of a signal to noise ratio of the following form as it appears in the output signal:

$$S/N = \text{Signal to Noise Ratio} = (\text{Power in } S(t))/(\text{Power in } \eta(t)) \quad \text{(Eq. 1)}$$

The present invention differs from the known prior art target detection devices in many significant aspects. In the present invention a "class" of nonlinear filters are defined in a mathematical sense that have not been previously known or published in the prior art. It will be shown that there exists an infinite number of possible SR filters that can be synthesized and a general mathematical expression of this "class" of filters will be discussed using potential energy and force methods. Further, all prior applications of the SR principle have dealt with the case that the signal to be identified is slightly less than a threshold value. This means the signal to noise ratio is approximately 1.0. This patent application deals with the case that the S/N ratio may be in the range of 1/10,000 or smaller.

From a practical standpoint, the present invention deals with target detection and not a communications system application. The approach here is to use the Fourier series decomposition of the target signal to state the claim of improved target identification. This clearly distinguishes the present invention from the prior art. Further, none of the prior art has shown a specific procedure on how to relate the noise level to specific parameters in the filter design. Finally, the present invention discloses unique data on how the amplification of S/N can be obtained using the techniques herein. The data demonstrate the efficacy of the proposed methods using extraordinarily high levels of noise to signal (greater than 10,000). Few known prior art systems have laboratory data to support the efficacy of their proposed methods.

For optimal target detection, the goal of the present invention is to make the ratio S/N as large as possible. If the S/N ratio is increasing, this improves the quality of the information we gather and enhances our ability to make good decisions. It should be noted that for strictly linear systems, such as that shown in FIG. 2, it is known that increasing the power in the noise η(t) can only degrade the S/N ratio and hence the ability of the linear detector to discern a target.

SUMMARY OF THE INVENTION

Nonlinear target detection for the detection of extremely weak signals when buried in very high levels of noise is performed with improvement of the quality of the signals received in the data by the amplification of the signal to noise (S/N) ratio. The S/N ratio increases dramatically after the originally measured signal is passed through a nonlinear stochastic resonance filter of the invention.

BRIEF DESCRIPTION OF THE DRAWINGS

FIG. 4a shows the bi-potential well problem.

FIG. 4b shows the equilibrium points for a physical system.

FIG. 5a shows a graph of a subliminal signal slightly below a threshold indicator.

FIG. 5b shows a graph of the subliminal signal with a little noise added.

FIG. 5c shows a graph of the subliminal signal of FIG. 5a with a lot of noise added.

DETAILED DESCRIPTION

Figure 1:
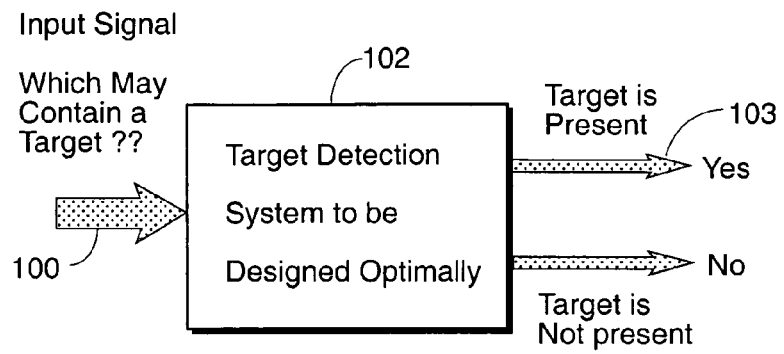
FIG. 1 is a diagram showing a target detection problem.
Figure 2:
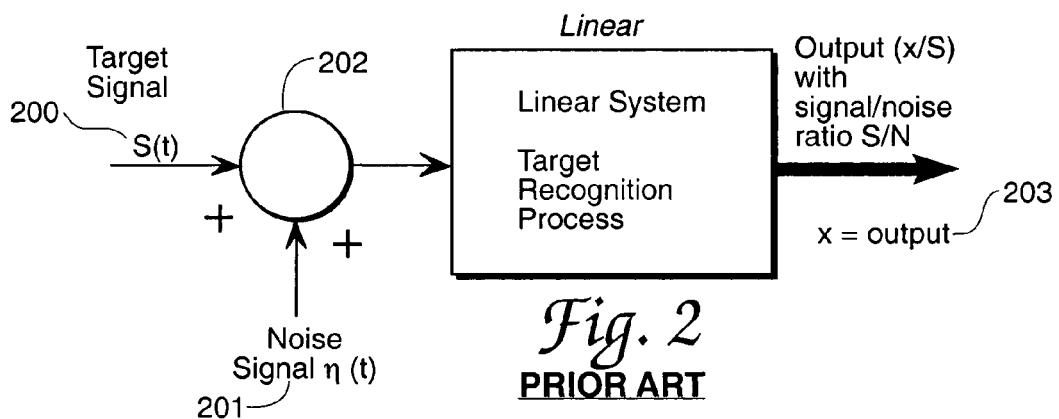
FIG. 2 is a diagram showing traditional target recognition with linear systems.
Figure 3:
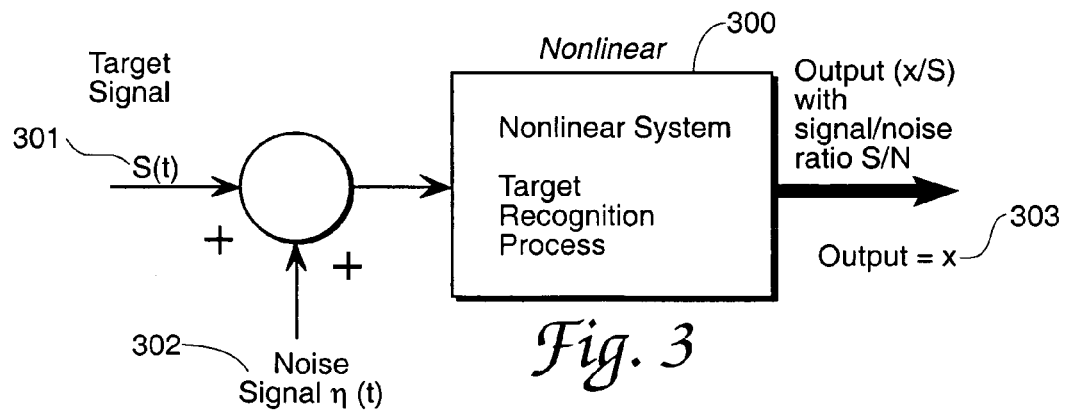
FIG. 3 is a diagram of target recognition with nonlinear system dynamics of the invention.

The novel approach of the present invention is illustrated in FIG. 3. In FIG. 3, the target detector 300 is replaced by a nonlinear system/filter. By using a nonlinear block in FIG. 3, the input signal S(t) 301 may be easier to detect at the output 303 due to an increased S/N ratio. One reason this occurs is that for certain nonlinear systems, by adding small amounts of noise, the resulting nonlinear system may have many more degrees of freedom as compared to an equivalent linear system. One disadvantage of using the nonlinear system/filter involves the possibility that the signal S(t) may be distorted at the output. Since the goal is target detection, the advantages of an improved S/N ratio may outweigh the distortion that could possibly appear at the output signal x(t) due to the nonlinear dynamics.

The present invention will show that by increasing the power in the noise source η(t) can actually enhance the sensitivity of the nonlinear system in FIG. 3 to the point that the S/N ratio actually increases. The increase in the S/N ratio can be made greater than an equivalent linear system. This is a very counterintuitive result (by adding more noise, you actually improve the S/N ratio). The physical explanation of why this effect occurs is a consequence of the fact that the increased randomness excites the richness of the nonlinear dynamics of the system in FIG. 3 to the point that the target detector actually performs better due to the enhanced and improved dynamics that result.

To synthesize a nonlinear system that will enable improved S/N ratios, it is necessary to first review some basic principles from two physics examples where it is demonstrated that the principle of stochastic resonance is known to work.

Stochastic resonance (SR) describes the phenomenon observed when adding a small amount of noise to certain nonlinear systems that tends to improve some of their response properties. Two examples from physics add credence to the arguments of this counter-intuitive phenomenon.

Example 1 from Physics—A Bi Potential Well Problem

FIG. 4a illustrates an interesting problem in physics in which a ball is located within a potential well with two stable states. The ball 400 is given movement by providing a small amount of force, represented by the term S(t) at 401 (which can be a periodic signal), but does not have sufficient magnitude to enable the ball to roll over the potential barrier of height h and transition from one side of the potential well to the other side 403 (switch states). If S(t) 401 is a sufficiently weak signal, the ball is trapped in one of the two wells and cannot change state (move to the other well) very easily. One measure of successful performance is the ball in FIG. 4a having the ability to switch states moving from one well to another even though the signal S(t) may be too weak to overcome the potential barrier of h units.

Given the above situation, a noise term η(t) is now added to S(t). If the noise is zero mean and sufficiently random, the ball in FIG. 4a will, occasionally, have the energy to overcome the potential height of h units and change states, going back and forth between the two state conditions. In FIG. 4b, there are plotted the three equilibrium points for the Bi-potential well of FIG. 4a. Three equilibrium points exist in FIG. 4b at x=−a, 404, x=0, 405 and x=a, 406. To show, in a physical sense, that the point x=−a, 404, is a stable equilibrium, the test is to position the ball at the point x=−a and to make small perturbations in the displacement of the ball. If the ball then always returns to the same equilibrium point (x=−a), then the equilibrium point is considered "locally stable". This same effect occurs at the point x=a, 406, if the ball is perturbed slightly, it will always return to the original point (x=a). However, the equilibrium point x=0 is unstable. To see why this is so, the ball is positioned at the origin (x=0) and perturbed slightly. The resulting motion will always be away from the original equilibrium (x=0) so it is said that the equilibrium x=0 is considered "locally unstable".

There is a mathematical way to describe this physical process. The following nonlinear differential equation has the precise same equilibrium points as in FIGS. 4a and 4b but expressed in equation form:

$$\dot{x} = x(a^2 - x^2) \tag{Eq. 2}$$

where $$\dot{x} = \frac{dx}{dt}$$

is the time derivative of x(t) and the equilibrium point in mathematics means the lim x(t) as t→∞ which occurs when $\dot{x} \to 0$, and is a valid definition of an equilibrium point. Referring back to Eq. 2 this implies:

$$0 = x(a^2 - x^2) \tag{Eq. 3}$$

which has a solution at x=0 and x=±a. There is a simple way to test, from the mathematics, whether an equilibrium point is stable or unstable. Stability is more difficult to define for nonlinear systems, so it is necessary to go back to the original differential equation near each equilibrium point and look at how the equation behaves proximal to each equilibrium point. To show that x=0 is an unstable equilibrium point, look at equation (2) near x=0 but slightly positive (x=+ε where ε is a small positive number). Then $$\dot{x} = x(a^2 - x^2) \approx \epsilon(a^2) > 0 \tag{Eq. 4}$$

Thus, the trajectory slightly to the right of the point x=0 has $\dot{x}>0$ and moves further to the right (x(t) grows with time in a positive direction). This is an unstable equilibrium because a small perturbation (ε>0) moves the trajectory in a direction away from the equilibrium point. This result also occurs to the left of the point x=0. If we have a small perturbation (x=−ε) then the calculation of $\dot{x}$ proceeds as follows:

$$\dot{x} = x(a^2 - x^2) \approx -\epsilon(a^2) < 0 \tag{Eq. 5}$$

Thus being slightly left of the point x=0 makes $\dot{x}<0$ and the trajectory moves further left away from the equilibrium. As shown in FIG. 4b, the trajectories move away from the equilibrium x=0 in both directions, hence it is an unstable equilibrium.

To show that x=a>0 is a stable equilibrium, we look at small perturbations near x=a and calculate $\dot{x}$. For example, to the right of x=a, let x=a+ε and calculate $$\dot{x}x(a^2 - x^2) \approx a(-2a\epsilon - \epsilon^2) < 0 \tag{Eq. 6}$$

Hence being slightly to the right of the point x=a, then $\dot{x}<0$ and the trajectories move back to the left towards the original equilibrium point (x=a) and this is characteristic of a stable equilibrium. Continuing this analysis, slightly to the left of the point x=a (for example, at x=a−ϵ), it is seen that (note a>ϵ>0):

$$\dot{x}=x(a^2-x^2)\approx a(2a\epsilon-\epsilon^2)>0 \quad \text{(Eq. 7)}$$

resulting in $\dot{x}>0$ and the trajectory is increasing in x and moving to the right back towards the original equilibrium point (x=a). Hence x=a is a stable equilibrium point. The same analysis also applies for the equilibrium point x=−a where it can also be shown to be stable.

Most prior work on stochastic resonance has dealt with the case a=1 or with a nonlinear differential equation (including the signal term S(t) and the noise term η(t)) as follows:

$$\dot{x}=x-x^3+S(t)+\eta(t) \quad \text{(Eq. 8)}$$

where the terms S(t) and η(t) act as forcing function inputs and the homogenous portion of Eq. 8 is of the form $$\dot{x}=x-x^3 \quad \text{(Eq. 9)}$$

which has one unstable equilibrium point (x=0) interlaced between two stable equilibrium points (x=±1). This is the situation where stochastic resonance will work when the equilibrium points that appear in the mathematical equation are interlaced such that one unstable equilibrium point is surrounded (on both sides) by two stable equilibrium points. The analysis of this physical example with the mathematical relationships provide a basis for the synthesis of an infinite class of filters that demonstrate the stochastic resonance effect for the nonlinear target detection of the invention. A second physical example will show an alternative interpretation of the stochastic resonance effect by using subliminal signals and threshold effects.

A Second Physical Example to Illustrate the Effects of Stochastic Resonance

In FIGS. 5a–5c, the subliminal signal S(t), illustrated at 500, takes the form of the trapezoid 501. The trapezoid 501 is slightly below the threshold as indicated by the line at 502. The goal is to detect when the trapezoid in FIG. 5a is in a high state versus the case when the trapezoid is in a low state. Since S(t) 500 is below the threshold 502 and we cannot perceive the signal unless it becomes greater than the threshold, we would always miss knowing whether the trapezoid is high or low. Hence there is 100% chance of missing the opportunity of knowing when the trapezoid is high. This is called a "missed positive." To the diagram of FIG. 5a a little noise is added, resulting in the diagram of FIG. 5b. In FIG. 5b, the total signal (S(t)+ξ(t)) 503 now starts to penetrate the threshold as illustrated at 504. In the case when the trapezoid is high, we are able to determine this fact because the overall signal (S(t)+ξ(t)) has now penetrated the threshold and we can now perceive the high state condition. Thus we have fewer missed positives in detection when the trapezoid signal is high. Continuing this trend, we aGain increase the level of noise and the graph in FIG. 5c shows what happens when we add too much noise. In FIG. 5c the trapezoid signal now penetrates the threshold 505 when the trapezoid is supposed to be high (reduces the number of missed positives) however, the trapezoid also (occasionally) penetrates the threshold 506 when the trapezoid is low. This is a false positive condition and we are now making errors by adding too much noise. The overall effect of this discussion can be summarized in FIG. 6, which brings all these results together in one simple stochastic resonance curve based on this second physical example.

Figure 6:
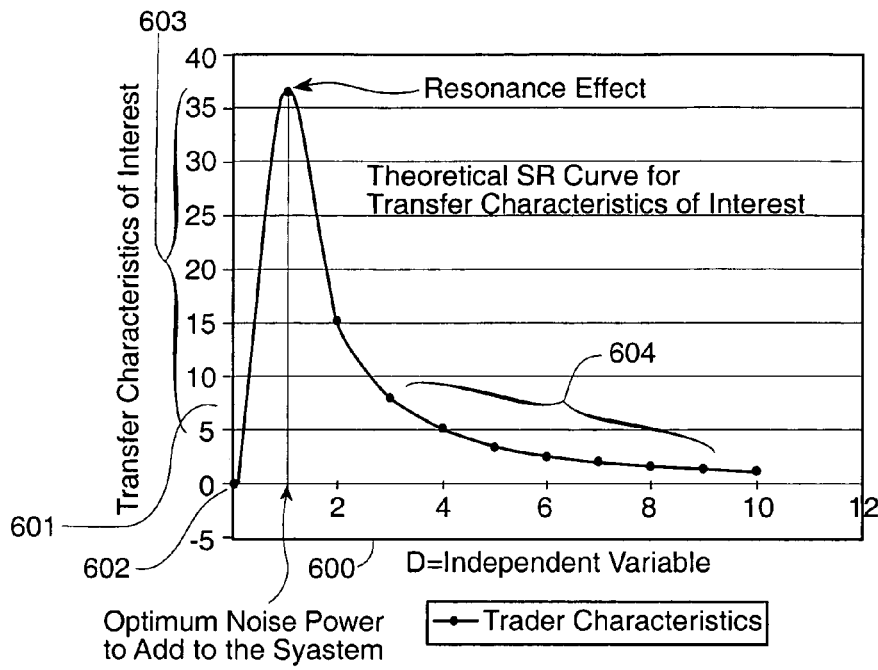
FIG. 6 shows a graph of the resonance effect of the subliminal signal of FIGS. 5a–5c.

In FIG. 6, the bottom plot is a typical diagram of a stochastic resonance curve. The x-axis 600 is the variance (power or intensity) of the zero mean noise process. The y-axis of FIG. 6 at 601 is proportional to the probability of correctly detecting when the trapezoid is high when it is really high. At 602 in FIG. 6, when the noise is near zero, the likelihood of detecting when the trapezoid is high is near zero because the trapezoid signal is subthreshold and cannot be detected (even when it is high). It is seen in the bottom curve that as the noise power increases (moving to the right) on the SR curve in FIG. 6 (probability of correct detection) rises because there is a continued reduction of missed positives (in detecting when the trapezoid is high) when the noise power increases and the subthreshold signal now pierces the threshold. Moving further to the right in FIG. 6, the curve continues to rise until it peaks. The peak occurs because as the noise increases in power (the curve moves to the right), the number of missed positives continues to decrease but we now start to accumulate some false positives. False positives occur when the trapezoid is low but the noise has increased in value to the point that it still pierces the threshold and gives the false perception of the state of the trapezoid. Moving to the right on the SR curve in FIG. 6 the number of missed positives is always decreasing but the number of false positives is now starting to increase. To the left of the peak of the SR curve 603 the decrease in missed positives helps the decision making process because the small number of false positives that are created are not that detrimental as compared to the benefit achieved by reducing the number of missed positives. To the right of the peak of the SR curve 604, however, the number of false positives is now increasing to the point that they become counter productive. Finally the noise has increased in power to the extent that the false positives created by having too much noise outweighs the relative Gain achieved by reducing any missed positives. Hence the decision process breaks down because it is now not optimum to have all this noise in a decision making process. Thus the human or other evaluation system becomes an optimal decision maker when he operates near the peak of the SR curve in FIG. 6. Too much or too little noise is not helpful in this situation but the appropriate amount of noise works to the advantage of the decision maker. This second physical example shows the advantage of using the SR principle to detect a subthreshold signal by the injection of noise. Too much or too little noise may not be beneficial.

An important point that can be gleaned from this second example is in the relative magnitude of the subthreshold signal and the noise level. The second physical example works best if the signal and noise are about of equal magnitude. This means the S/N ratio should be in the order of 1.0 for the second physical example to work. In the literature, the second physical example is well known and this is why SR is known to be helpful in improving how humans perceive subthreshold signals better. However, the subthreshold signals cannot be too small and should be about the same level of the noise.

Figure 7:
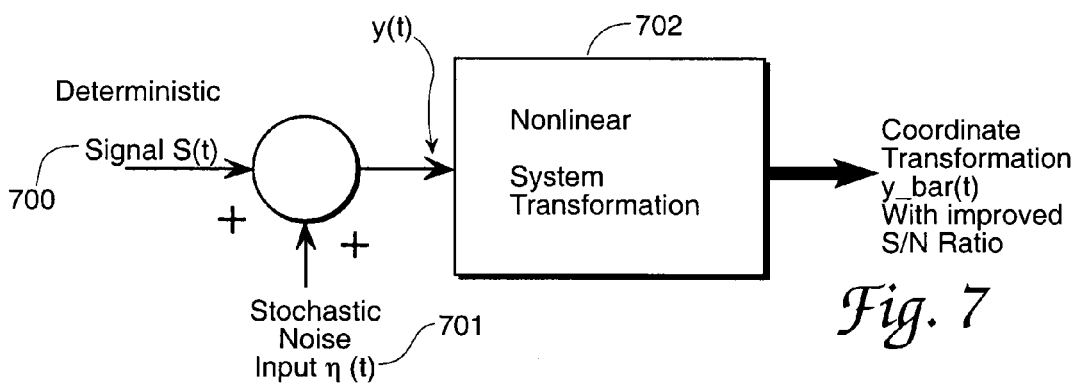
FIG. 7 shows a diagram of the process of producing stochastic resonance.

To summarize, in a block diagram, some of the concepts discussed up to this point FIG. 7 demonstrates this concept for both physical examples. In FIG. 7, the signal S(t) 700 is added to the left of the noise 701 and it is processed through a nonlinear dynamic system 702. The output is x(t) and the objective is to improve some relationship at the output in terms of the original signal. This could be either signal to noise ratio or possible the detection of S(t) as a subthreshold signal.

To succinctly describe the method and device of the invention, we describe the following steps.

Step 1: The target signal S(t) is decomposed into its Fourier components as mentioned previously:

$$S(t) = \sum_{i=1}^{N} a_i \sin(\omega_i t + \phi) + b_i \cos(\omega_i t + \phi) \qquad \text{(Eq. 10)}$$

Step 2: The measured signal y(t) is passed through the nonlinear transformation of FIG. 7 such that the transformed signal $\bar{y}(t)$ can be used for target detection purposes.

Step 3: A Fourier series analysis of $\bar{y}(t)$ can be determined by the decomposition:

$$\bar{y}(t) = \sum_{i=1}^{N} \bar{a}_i \sin(\omega_i t + \phi) + \bar{b}_i \cos(\omega_i t + \phi) \qquad \text{(Eq. 11)}$$

Step 4: Hypothesis testing and other standard tests can be made in comparing the derived parameters $(\bar{a}_i, \bar{b}_i)$ from Eq. 11 to the relevant parameters $(a_i, b_i)$ from the desired target signal in equation Eq. 10. The standard Bayesian or Neyman-Pearson approach can be used to determine with what statistical confidence the parameters obtained are similar and the target will be detected. These two methods are employed based on the parameter estimates obtained of $(\bar{a}_i, \bar{b}_i)$ and their closeness to the parameters of S(t) given by $(a_i, b_i)$.

The novel contributions of the method and device of the invention include the capability for a wide class of SR filters to be synthesized using force and potential energy methods. Additionally, a design procedure is provided which means designing the level of noise that will appropriately work with the nonlinear system dynamics as well as the amplitude level of the signal that is desired to be detected.

Designing Nonlinear Filter Dynamics

Considering Eq. 9, it can be shown that in all cases, an unstable equilibrium point is inserted between two stable equilibrium points. Let the nonlinear differential equation of the SR filter be expressed in the form:

$$\dot{x} = f(x) + S(t) + \eta(t) \qquad \text{(Eq. 12)}$$

where the S(t) is the target signal to be detected and $\eta(t)$ is the noise seen in the measurement process. Eq. 12 can be rewritten in the form:

$$\dot{x} = f(x) + y(t) \qquad \text{(Eq. 13)}$$

where y(t) is the standard measurement specified previously by $y(t) = S(t) + \eta(t)$. The rules govern the nonlinear dynamics specified by the homogenous term of Eq. 13 and specified via:

$$\dot{x} = f(x) \qquad \text{(Eq. 14)}$$

and the infinite class of functions f(x) that will demonstrate stochastic resonance is defined as follows:

f(x) must have power of $x^3$ or higher (at least three equilibrium points must occur).

The equilibrium points resulting from setting f(x)=0 must have two stable equilibrium interlaced and separated by an unstable equilibrium point.

There are an infinite class of systems that satisfy the above two conditions and f(x) may contain higher powers of x but the equilibrium points must be interlaced and alternated between stable and unstable equilibriums. For example, there are three classes of systems that have the ability to exhibit stochastic resonance in their response outputs. These systems were synthesized by shaping the potential energy functions so that an unstable equilibrium falls between two stable equilibrium points. The nonlinear homogenous equation of the filter are specified by:

$$\dot{x} = f(x) = -\frac{dV(x)}{dx} \qquad \text{(Eq. 15)}$$

where V(x) is the potential function that was originally shaped for the application of interest.

Examples of an Infinite Class of New Systems that Exhibit SR:

Class 1:

$$\dot{x} = (x)[a+x][a-x] \qquad \text{(Eq. 16)}$$

where a>0. If a=1 this system has previously been discussed in Eq. 2 and this example has been well studied in the literature.

Class 2:

The following SR nonlinear filter was derived:

$$\dot{x} = f(x) = -(x+a_1)(x+a_2)(x-a_3)(x-a_4)(x-a_5) \qquad \text{(Eq. 17)}$$

Class 3:

The following SR nonlinear filter was also derived:

$$\dot{x} = f(x) = (x+a_1)(x+a_2)(x+a_3)(x-a_4)(x-a_5)(x-a_6)(x-a_7) + \\ (k)(e^{-b_1 x} - e^{-b_2 x}) + f(e^{-b_3 x} - e^{-b_4 x}) \qquad \text{(Eq. 18)}$$

Outlines of the potential energy surfaces are given above the pole-zero diagram to illustrate why stochastic resonance will work in each of these cases.

A testing procedure employed on the designs presented is utilized to show the significantly improved signal/noise amplification that can be obtained through the use of the target detector device and method of the invention. To be somewhat brief, the nonlinear dynamic system that will be discussed will involve the standard SR equation that is well known in the literature and specified via:

$$\dot{x} = x - x^3 + S(t) + \eta(t) \qquad \text{(Eq. 19)}$$

which corresponds to the case of $a = \pm 1$ in Eq. 2. Simulations will be conducted for the case of h=0.1 as the potential barrier in FIG. 4a to show the efficacy of the proposed method.

Testing Procedure Employed to Evaluate the Nonlinear Dynamic SR Filter

Figure 8:
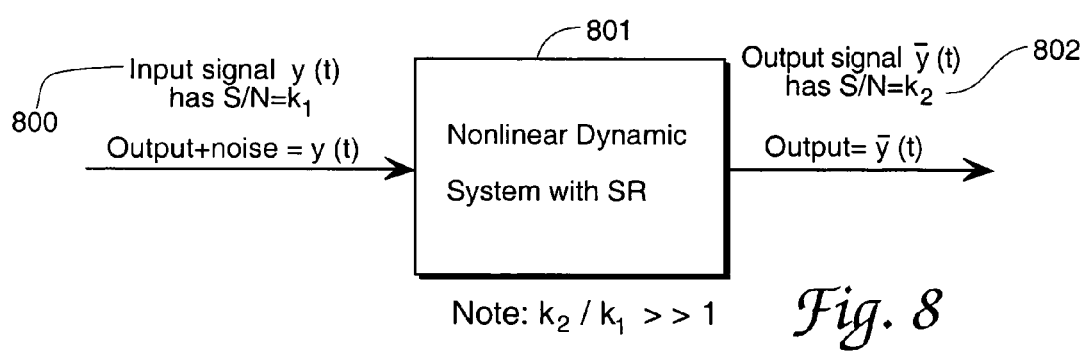
FIG. 8 shows a diagram viewing a SR Dynamic Filter as a single/noise amplifier.

A simple method is used to evaluate the performance of the nonlinear dynamic SR (stochastic resonance) filter discussed as part of the method and device of the invention. It will also be shown that it is possible to realize a significant amplification of the signal to noise (S/N) ratio using the method and device of the invention. This S/N amplification can be much, much greater than 1.0 in the output signal as compared to the input signal as depicted in FIG. 8, which shows a diagram viewing a SR Dynamic Filter as a single/ noise amplifier. It is seen in FIG. 8 that the input signal (y(t)) 800 to the nonlinear dynamic SR filter system has an input S/N ratio equal to $k_1$. However, after being processed (in real time) through the nonlinear dynamical system 801, the new output signal ($\bar{y}(t)$) 802 now has a S/N ratio of $k_2$. It will be shown that $k_2 \gg k_1$ which means that the "quality" of the information in the signal has been significantly improved by processing it through the nonlinear dynamical system. Generalizing this statement, one would think that continually to repeat this process again and again in an indefinite manner may result in no limit to the Gain of the quality factor S/N. This is not true because the system will break down in either one of two ways. The procedure will break down because as the S/N ratio decreases, it becomes computationally difficult and intensive to accurately integrate and determine the variable $\bar{y}(t)$, the output of the SR filter. Additionally, inaccurate results occur due to nonlinear distortion which eventually compromises the quality of the signal that is desired to be distinguished.

To test the system, an input signal S(t) will be selected to be the sum of two sine waves (with unity amplitude and having frequencies of 1 and 4 hertz (Hz)) denoted as follows:

$$S(t)=\sin(2\pi(1)t)+\sin(2\pi(4)t) \quad \text{(Eq. 20)}$$

Rationale for Selecting S(t) to be the Sum of Two Basic Sinusoids:

The selection of S(t) in Eq. 20 was chosen to be two sinusoids of different frequencies and equal amplitude. The rationale for this selection of a target signal is derived from studies in signal analysis where a measured signal is typically decomposed into its Fourier components as described in Eq. 21 as an inverse transform:

y(t)~Inverse Fourier Transform of $$\{Y(j\omega)\} \approx \sum_{i=1}^{N} a_i \sin(\omega_i t + \phi) + b_i \cos(\omega_i t + \phi) \quad \text{Eq. 21}$$

where the Fourier components occur at the frequencies $\omega_i$ and are represented by amplitudes $a_i$ and $b_i$ as the significantly important components of the signal y(t). In Eq. 21, only N frequencies are considered, which is an approximation to the original signal y(t). Since most signals in nature have a substantial portion of their power at low frequencies, the approximation of the first N components seems practical. The task of target detection can be formulated as the role of identifying a single (or multiple) sinusoid(s) in noise or possibly distinguishing two different target signals. To distinguish two different targets in noise, each signal can be decomposed as per the Fourier description in Eq. 21. The task is then to identify the signature of each target (sets of $a_i$ and $b_i$ values from the Fourier analysis that make the targets different) when buried in noise. Thus the evaluation example to be presented here will look at two simple sinusoids buried in noise. The goal is to clearly distinguish the Fourier components of S(t) as being different from the adjacent noise signals that appear in the power spectral analysis of the signals y(t) or $\bar{y}(t)$.

Figure 9:
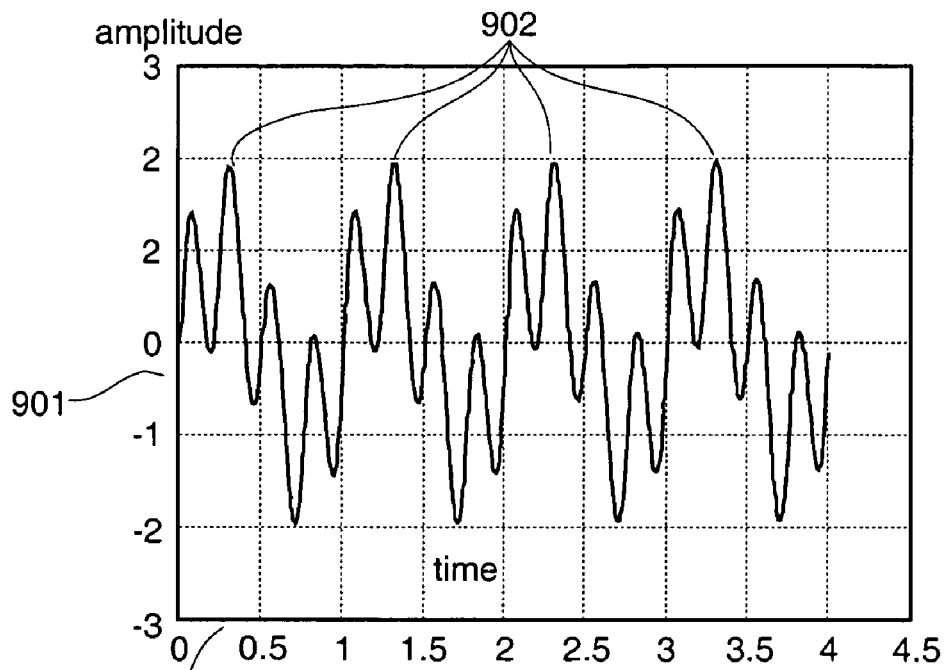
FIG. 9 shows a graph with S(t) plotted in real time over a period of 4 seconds.
Figure 10:
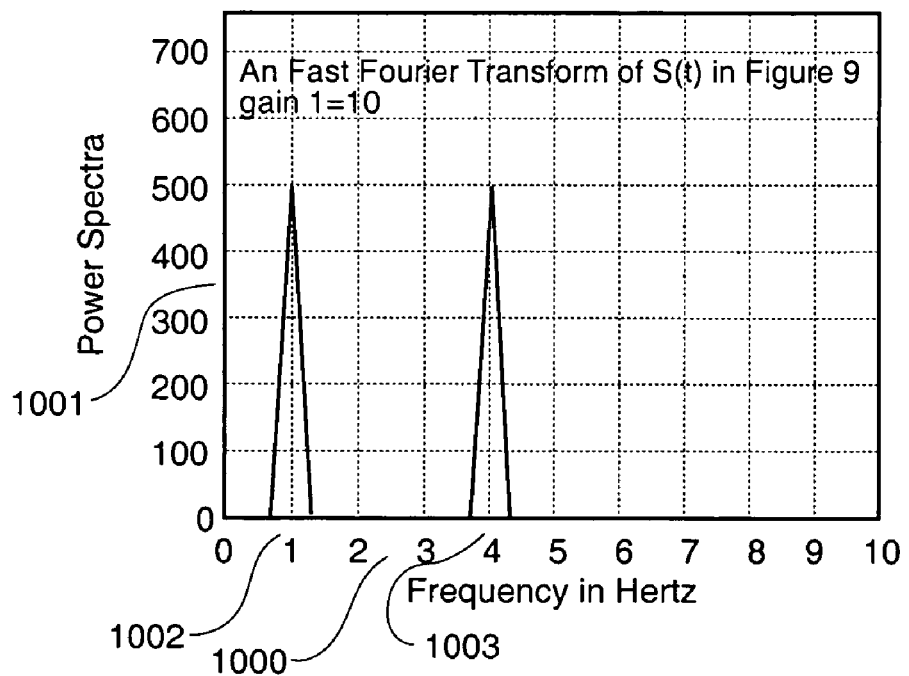
FIG. 10 shows a graph of a Fast Fourier Transform of the S(t) signal of FIG. 9.

In real time, FIG. 9 displays a plot of S(t)=sin(2πt)+sin (8πt) versus time in seconds over a four second period. In FIG. 9, the x-axis represents time and the y-axis represents amplitude. It is seen that the components of 1 Hz and 4 Hz are very apparent in the signal in FIG. 9. For example, the 4 Hz component is obvious as FIG. 9 displays four complete oscillations, illustrated at 902, at the higher frequency every second. The 1 Hz component is also apparent because the overall signal repeats itself and is identical during every 1-second period. To see this effect even more clearly, a fast Fourier transform (FFT) operation of the signal S(t) is displayed in FIG. 10. In FIG. 10 it is observed, for this two sine wave signal, that the power in S(t), illustrated on the y-axis at 1001, in the frequency domain, is concentrated at the points 1 Hz, 1002, and 4 Hz, 1003 on the x-axis 1000 of FIG. 10. From FIG. 10, it is extremely easy to distinguish the two constituent components that make up S(t) (the peak power at 1 and 4 Hz).

With the addition of noise, however, the lucid diagram in FIG. 10 now becomes quite muddled. The input signal to be analyzed is y(t) which contains the sum of S(t) and white-Gaussian noise, i.e. y(t) satisfies:

$$y(t)=S(t)+\eta(t) \quad \text{(Eq. 22)}$$

and the fast Fourier transform is now performed on y(t) rather than S(t). As the power of the noise ($\eta(t)$) term increases, the goal is to still attempt to identify (and distinguish) the two peaks of S(t) in the frequency domain at 1 Hz and 4 Hz from the power spectra plots of y(t) or from its transformed counterpart $\bar{y}(t)$ shown in FIG. 8. It is noted that the zero mean Gaussian (normal) noise source $\eta(t)$ has a density function specified via:

$$\text{density function} = g(x) = \frac{1}{\sigma\sqrt{2\pi}} e^{-x^2/2\sigma^2} \quad \text{(Eq. 23)}$$

where σ is the standard deviation of the random process in Eq. 23. For simulation purposes, to compare traditional detection methods to those of the SR nonlinear dynamical system, the pure, deterministic signal S(t) was slightly modified to be of the form:

$$S(t)=\text{Gain1}*[\sin(2\pi(1)t)+\sin(2\pi(4)t)] \quad \text{(Eq. 24)}$$

and the noise term is describe via $$\eta(t)=\text{Gain1}*\text{Gain2}*randn(.) \quad \text{(Eq. 25)}$$

where the function randn(.) is used in MATLAB™ to call the white-Gaussian noise generator. Noting that the constant, Gain1, multiplies both S(t) and $\eta(t)$, then the remaining variables in Eqns. 23 and 25 influence the determination of the signal to noise ratio (Gain2 and the second variable σ which was set to σ=1). The calculation of the S/N ratio in the frequency domain is proportional to the square of the magnitudes of the Fourier components of S(t) to the corresponding values for $\eta(t)$. Thus, it can be shown that the relative comparison of any numerical simulation is proportional to $(1/(\text{Gain2}))^2$ in terms of S/N ratio compared to the baseline condition (Gain2=1). The Gain 1 term has no effect on S/N but sets up a baseline or standard for all relative measurements. A series of plots of the output variable are now displayed for:

$$y(t)=S(t)+\eta(t) \quad \text{Eq. 26}$$

with their fast Fourier transform sketches using this conventional method.

Conventional Method (Not Using the SR Nonlinear Dynamical Filter)

Figure 11A:
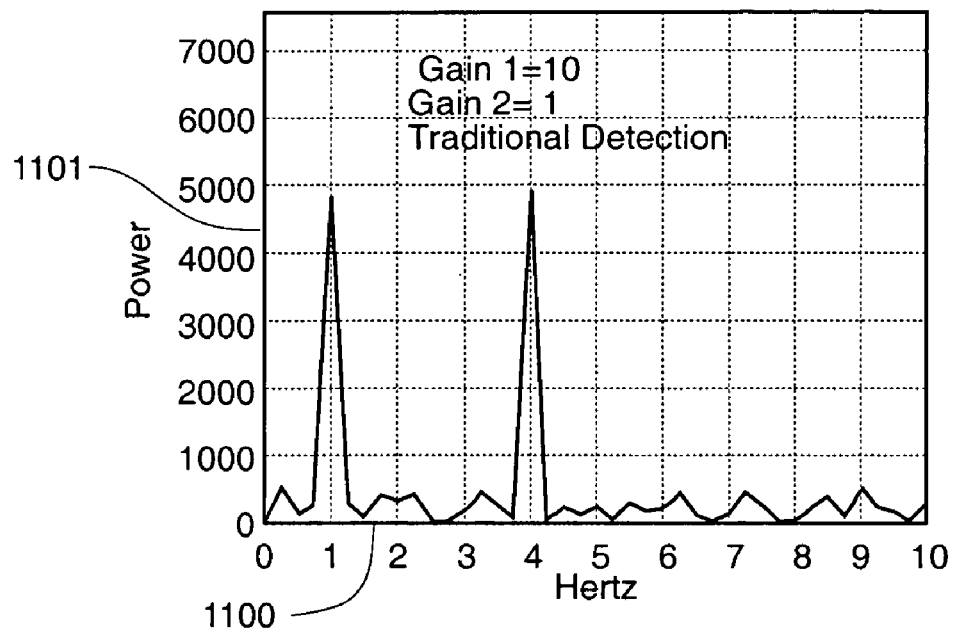
FIG. 11a shows a graph illustrating power in the spectral components of noise for a Gain of 1=10 and Gain 2=1.
Figure 11B:
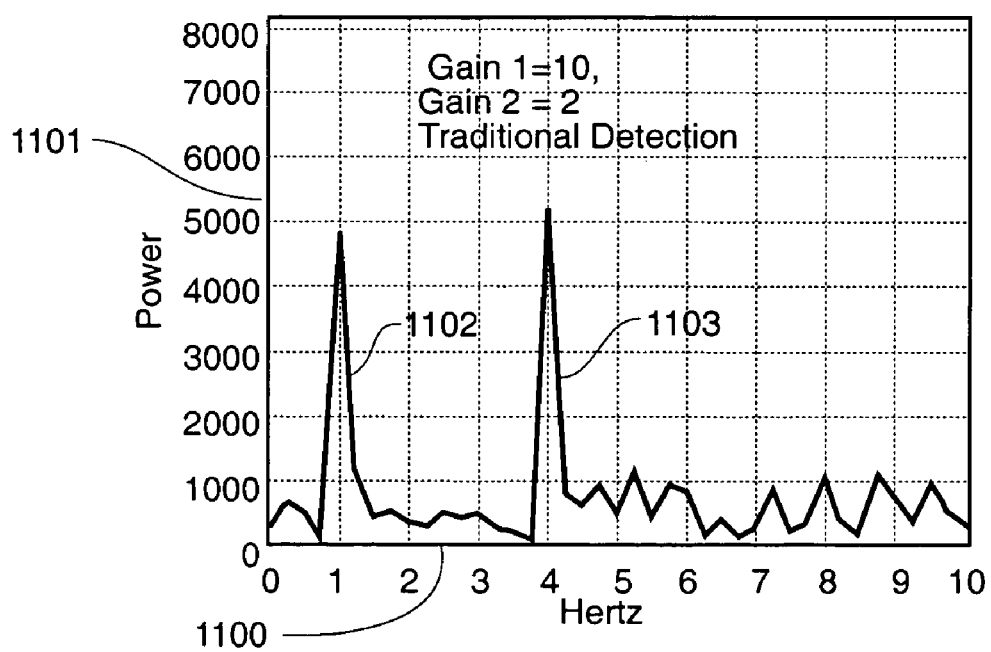
FIG. 11b shows a graph illustrating power in the spectral components of noise for a Gain of 1=10 and Gain 2=2.
Figure 11C:
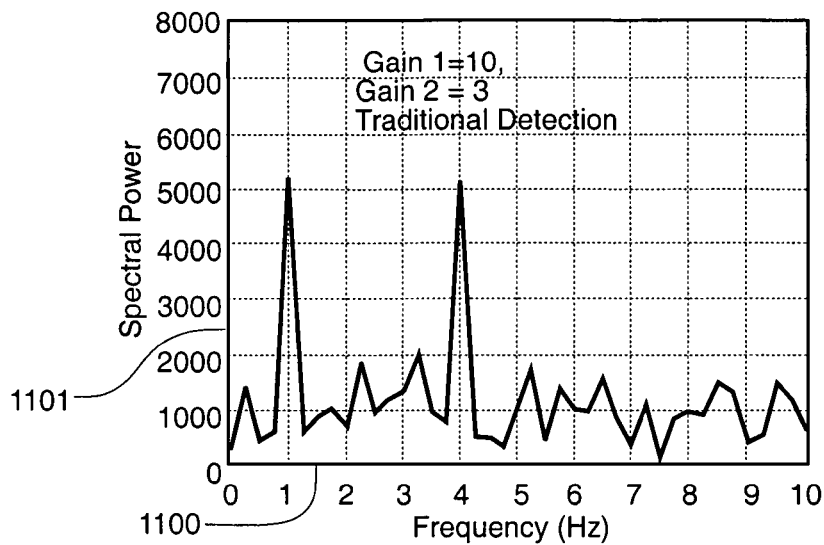
FIG. 11c shows a graph illustrating power in the spectral components of noise for a Gain of 1=10 and Gain 2=3.
Figure 11D:
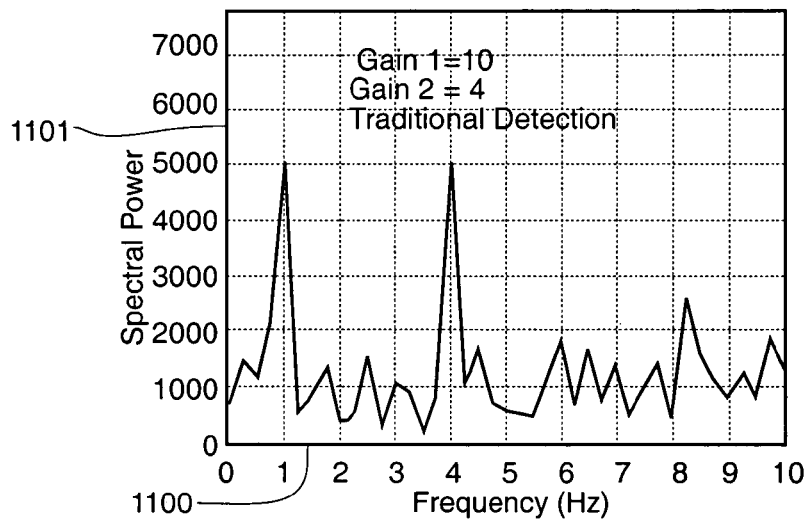
FIG. 11d shows a graph illustrating power in the spectral components of noise for a Gain of 1=10 and Gain 2=4.
Figure 11E:
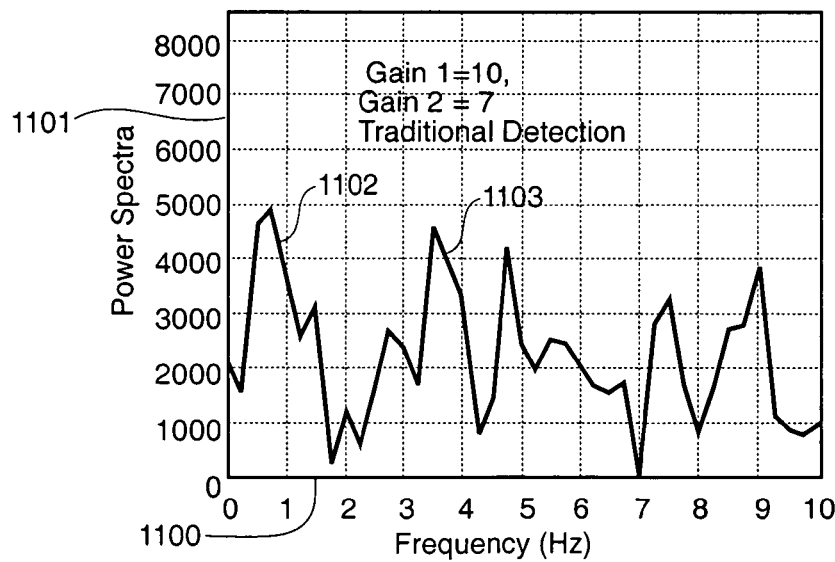
FIG. 11e shows a graph illustrating power in the spectral components of noise for a Gain of 1=10 and Gain 2=7.

The conventional method will deal with the analysis of the signal y(t) using Fourier analysis. FIG. 11a illustrates the FFT plot of y(t) for the case of Gain1=10 and Gain2=1. In FIG. 11a, as well as FIGS. 11b–11e, the x-axis 1100 represents frequency in Hertz and the y-axis 1101 represents power. This corresponds to a baseline condition to study the S/N. It is seen in FIGS. 11a–11e that the power in the spectral components of the noise (normal, Gaussian) appears at all frequencies and slowly creeps upward as Gain2 increases to the point that it will eventually cause confusion in the identification of the target signals at 1 Hz and 4 Hz. FIG. 11b shows the resulting plot for the same value of Gain1 but with Gain 2=2. This means the S/N ratio is now reduced a factor of ¼ from the FIG. 11a case but it is still easily possible to detect the two S(t) peaks at 1 Hz 1102 and 4 Hz 1103. FIGS. 11c and 11d illustrate the similar plots when Gain2=3 and Gain2=4. FIG. 11e portrays the FFT of y(t) when Gain2=7.

From FIG. 11e, it is obvious that it is now much more difficult to discern the peaks of the 1 Hz, 1102, and 4 Hz, 1103, signal because of the masking introduced by the noise. The actual S/N in FIG. 11e is proportional to $1/(7)^2$ compared to the baseline condition in FIG. 11a. From observing FIG. 11e, it is obvious that if Gain2>7, it becomes increasingly difficult to accurately detect a target comprised of the deterministic (sine waves at 1 Hz and 4 Hz) signals contained in S(t).

Nonconventional Methods (Using the SR Nonlinear Dynamical Filter):

The method and device of the invention deals with the signal $\bar{y}(t)$ after it has been obtained by passing y(t) through the nonlinear SR filter in FIG. 8. Power spectral analysis will also be performed on the signals $\bar{y}(t)$ and contrasted to those similar analyzes performed on y(t). As a comparison to the data presented in FIGS. 11a–11e, the real time noisy data y(t) are now input into the nonlinear dynamic system of FIG. 8. The FFT analysis was then conducted on the output signal $\bar{y}(t)$ as described in FIG. 8. The Gain 2 variable was adjusted upward to take on situations in which Gain2>>7. We illustrate, for comparison, some extreme examples.

Figure 12:
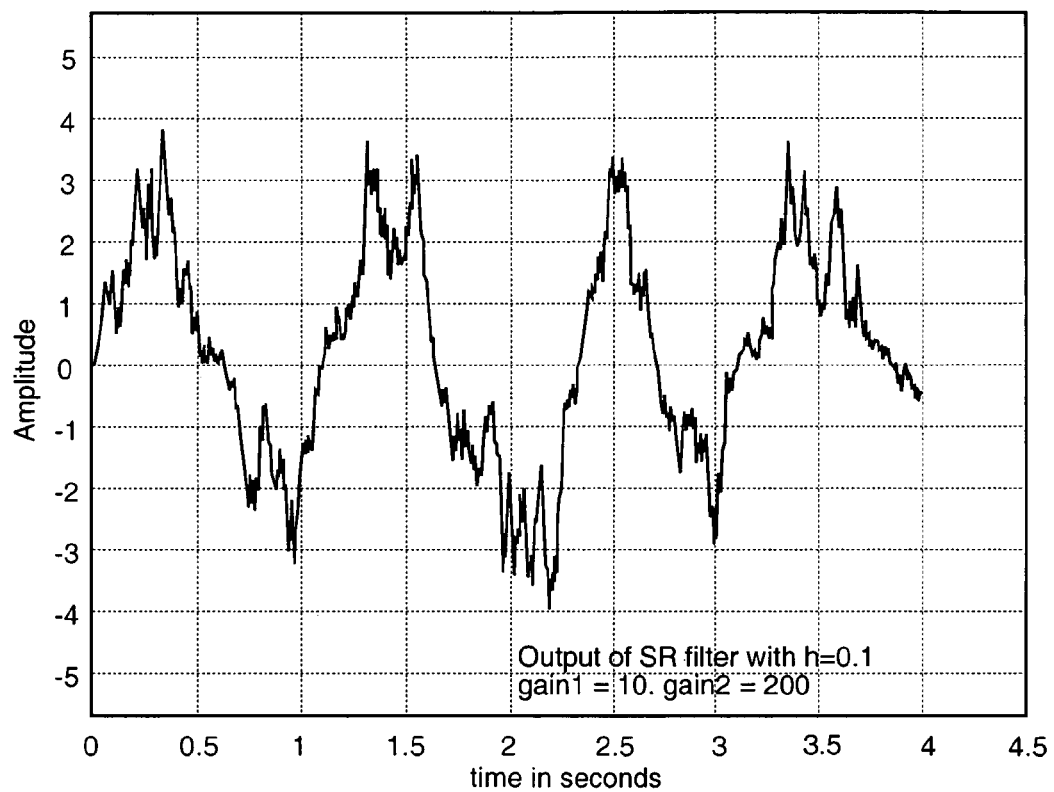
FIG. 12 shows an output graph of an SR filter with h=0.1, Gain1=10 and Gain2=200.
Figure 13:
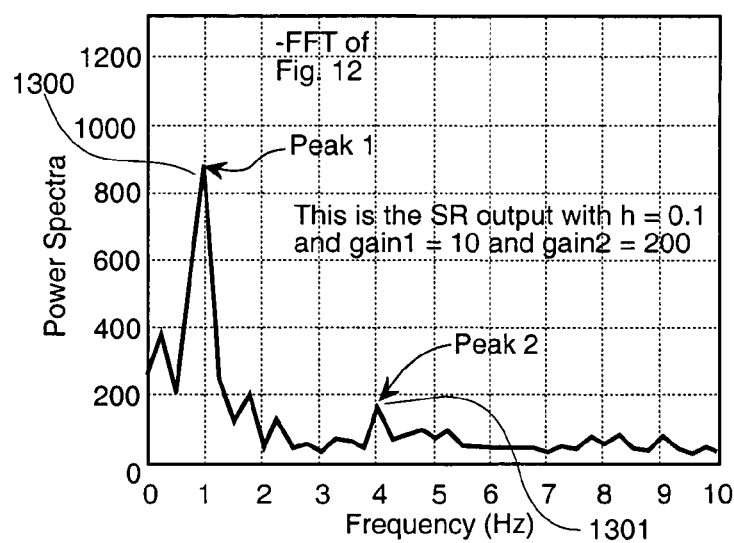
FIG. 13 shows a Fast Fourier Transform of the output of the SR filter of FIG. 12.

FIG. 12 illustrates the output ($\bar{y}(t)$) of the SR nonlinear filter in real time when the value of Gain2=200, Gain1=10, and h=0.1 for the potential barrier height of the SR filter previously described. A comparison should be made between FIG. 12 and FIG. 9, the latter of which is noise-free data (in real time). It is seen in FIG. 13 (FFT of FIG. 12) that even with a significantly reduced S/N ratio (comparing $1/(7)^2$ to $1/(200)^2$) it is still possible in FIG. 13 to discern that a significant event occurs at a 1 Hz component 1300 and at a 4 Hz component 1301 of the input signal. This seems plausible in comparing FIG. 12 to FIG. 9 where the output seems periodic and somewhat in phase with the true deterministic signal.

From FIG. 13, it is clear that it is possible to discern the two frequencies in the input signal S(t), even when the S/N ratio has been compromised by a factor of $(1/(7)^2)/(1/(200))^2$ which represents an amplification of the S/N ratio.

Figure 14:
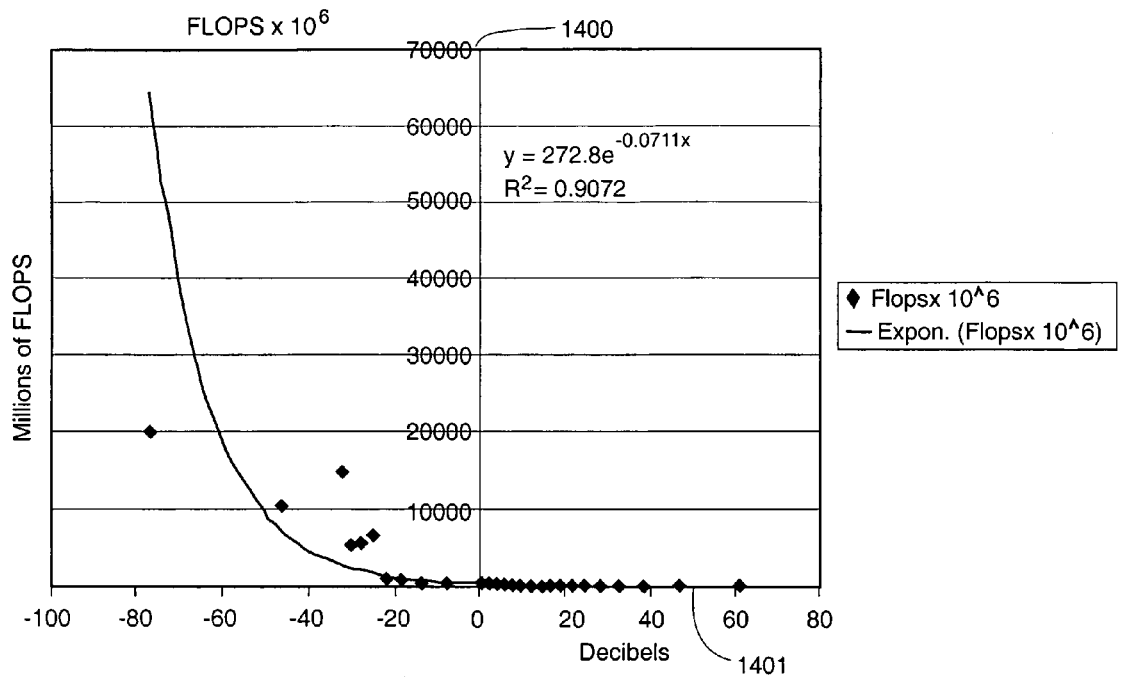
FIG. 14 shows a plot of the number of Floating Point Operations necessary to compute the SR filter output ȳ(t).

Additional arrangements of the invention should attempt to minimize computational complexity and distortion in order to avoid inferior performance. For the computational complexity issue, runs have been conducted for values of Gain2 at levels of 900 or more. FIG. 14 illustrates a plot of the number of FLOPS (Floating Point Operations) necessary to compute the SR filter output $\bar{y}(t)$. The number of FLOPs in millions is represented on the y-axis at 1400 plotted against time on the x-axis at 1401.

In the case of Gain2 at a level of 900 requires approximately $2 \times 10^{10}$ FLOPS which can be computationally excessive. In some applications, however, when it is essential to detect an extremely weak signal in noise, it is possible to use the method and device of the invention as described in this patent application to glean out information if computation time is not a critical issue.

Figure 15:
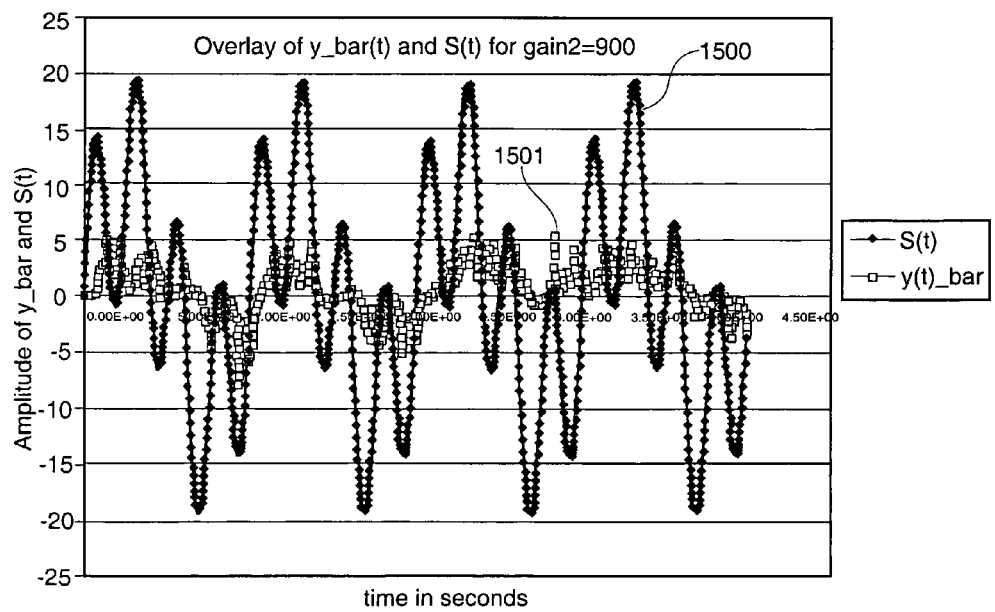
FIG. 15 shows an overlay of y_bar(t) and S(t) for Gain2=900.
Figure 16:
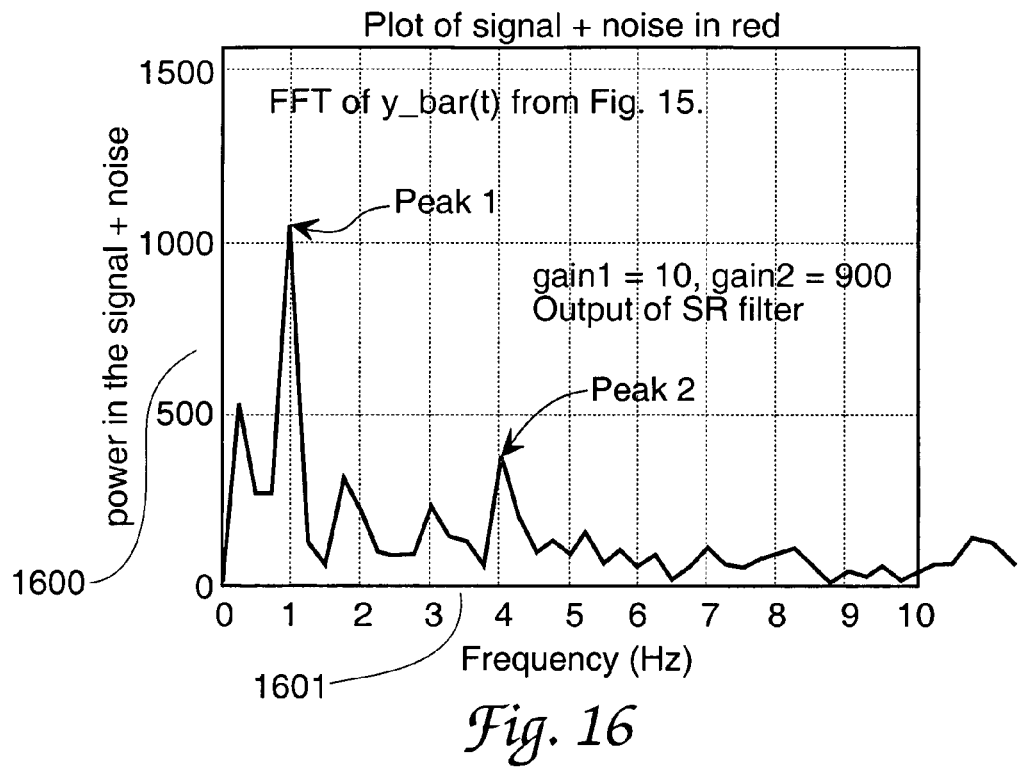
FIG. 16 shows a Fast Fourier Transform of the y_bar(t) of FIG. 15.

FIG. 15 displays how distorted the output signal $\bar{y}(t)$ for the SR filter in FIG. 9 may become as Gain2 approaches values of 900 or more. Superimposed on the plot for $\bar{y}(t)$ is the original signal S(t) 1500 in real time (Gain1=10). The transformed signal $\bar{y}(t)$ 1501 in FIG. 15 does not even complete a full cycle over the 4 seconds of data which introduces a nonzero mean component. This distorts $\bar{y}(t)$ from the original signal S(t) both in phase and in amplitude. When the FFTs are run, a resulting dc component (bias) is obtained which influences whether an accurate detection may occur, especially at low frequencies. This is to not an unusual result to expect since a nonlinear system has transformed the data from y(t) to $\bar{y}(t)$ which will normally produce distortion of this type to a sine wave input. It is interesting to note that the FFT of FIG. 15 shows the peaks of S(t) as demonstrated in FIG. 16. In FIG. 16 the power of the signal plus noise is represented on the y-axis at 1600 and the frequency is represented on the x-axis at 1601. Recall that the noise factor Gain2=900, which translates into a S/N ratio of approximately −55 dB. This is an incredible result considering the intensity of the noise relative to the target signal S(t).

Figure 17:
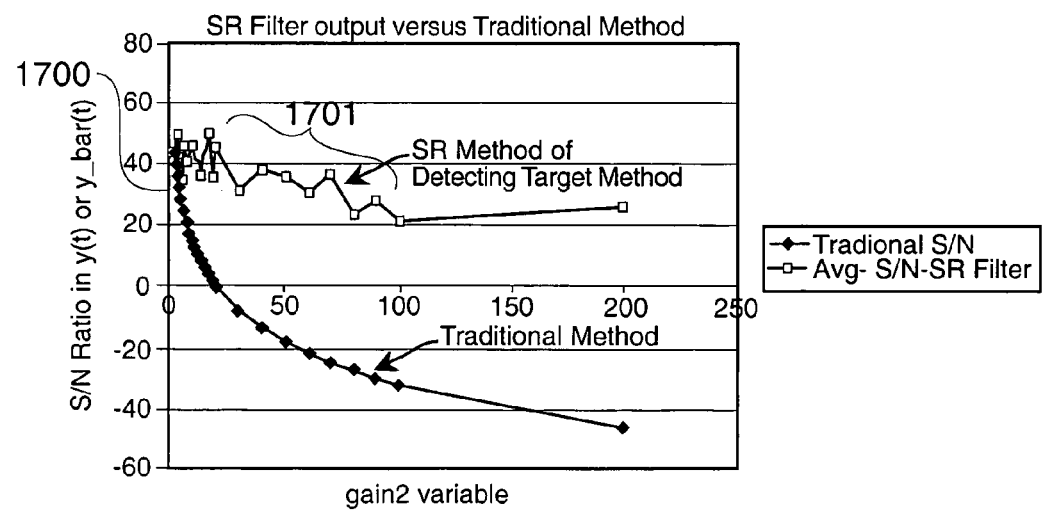
FIG. 17 shows a graph output of SR filter versus traditional methods.

FIG. 17 illustrates the overall comparison of the performance of the SR filter to the traditional methods as discussed previously. The performance of both systems in estimating a target is based on detecting targets when passed through nonlinear transformations such as portrayed in FIG. 8. The definition of S/N ratio (in decibels or dB) is specified via:

$$S/N \text{ ratio} = 10 \log_{10} \frac{S(\omega_0)}{N(\omega_0)} \quad \text{Eq. 27}$$

Where, at the frequency $\omega_0$, the power in the target signal $S(\omega_0)$ is determined as well as the noise power $N(\omega_0)$. Since it is desired to have a power measure, to determine $S(\omega_0)$, it can be further defined via the spectral power estimate at the frequency woo of interest, where:

$$S(\omega_0) = |Y(\omega_0)|^2 \quad \text{Eq. 28}$$

is the square of the magnitude (volts$^2$) of the output spectral signal. Thus the S/N ratio given in Eq. 27 is a true power measure and $10 \log_{10}$ is the appropriate conversion to obtain the terms in units of decibels. For the noise term, the noise power was estimated at adjacent frequencies to the frequency of interest (1 Hz or 4 Hz) and then averaged over adjacent frequencies. For FIG. 16, the S/N ratio of the output y(t) or $\bar{y}(t)$ was computed for both the 1 Hz signal and the 4 Hz signal and then averaged.

Results of the Comparison of Traditional Methods to the SR Method

In considering FIG. 17, some interesting results appear. For low values of noise (high levels of S/N, e.g. S/N=1 on the left side 1700 of FIG. 17, the traditional methods perform better than the SR filter. This is because the distortion introduced by the filter provides a disadvantage on the ability of the system to identify a target. However for increased levels of noise power (much lower levels of S/N on the right side 1701) of FIG. 17, which corresponds to high levels of Gain2, the nontraditional method introduced in this patent application yields a Gain of over 40 dB as compared to standard procedures. Since this is a power Gain, the 40 dB S/N amplification Gain translates into the ability to detect a target better using this new system, which is proportional to $10^4$ or provides a 10,000 amplification of the S/N ratio. This can only dramatically improve the ability to detect certain targets, especially when they are buried in extremely high levels of noise.

It is understood that certain modifications to the invention as described may be made, as might occur to one with skill in the field of the invention, within the scope of the appended claims. All embodiments contemplated hereunder which accomplish the objects of the invention have therefore not been shown in complete detail. Other embodiments may be developed without departing from the spirit of the invention or from the scope of the appended claims.

What is claimed is:

1. A highly sensitive, nonlinear target detection device comprising:
   a target signal;
   means for decomposing said target signal into Fourier components;
   an adder for summing a noise signal with said target signal;
   a nonlinear filter for transforming an output of said adder;
   means for analyzing output of said filtering step; and
   means for comparing output of said analyzing step with target parameters.

2. The highly sensitive, nonlinear target detection device of claim 1 wherein said means for decomposing further comprises means for decomposing said target signal into Fourier components $$S(t) = \sum_{i=1}^{N} a_i \sin(\omega_i t + \phi) + b_i \cos(\omega_i t + \phi).$$

3. The highly sensitive, nonlinear target detection device of claim 1 wherein said means for comparing further comprises means for comparing using Bayesian testing.

4. The highly sensitive, nonlinear target detection device of claim 1 wherein said means for comparing further comprises means for comparing using Neyman-Pearson testing.

5. The highly sensitive, nonlinear target detection device of claim 1 wherein said nonlinear filter further comprises a nonlinear filter exhibiting stochastic resonance in its response output.

6. The highly sensitive, nonlinear target detection method of claim 1 wherein said nonlinear filter comprises $\dot{x}=(x)[a+x][a-x]$ where $a>0$.

7. The highly sensitive, nonlinear target detection device of claim 1 wherein said nonlinear filter comprises $\dot{x}=f(x)=-(x+a_1)(x+a_2)(x-a_3)(x-a_4)(x-a_5)$.

8. The highly sensitive, nonlinear target detection device of claim 1 wherein said filter step further comprises filtering output of said summing step through a nonlinear filter $\dot{x}=x-x^3+S(t)+\eta(t)$.

9. The highly sensitive, nonlinear target detection device of claim 1 wherein said target signal comprises a sum of two sine waves with unity amplitude and having frequencies of 1 and 4 Hertz $S(t)=\sin(2\pi(1)t)+\sin(2\pi(4)t)$.

10. The highly sensitive, nonlinear target detection device of claim 1 wherein said noise signal comprises white a Gaussian noise.

11. A highly sensitive, nonlinear target detection method comprising the steps of:
   providing a target signal;
   decomposing said target signal into Fourier components;
   summing a noise signal with said target signal;
   filtering output of said summing step through a nonlinear filter transformation;
   analyzing output of said filtering step; and
   comparing output of said analyzing step with target parameters.

12. The highly sensitive, nonlinear target detection method of claim 11 wherein said decomposing step further comprises decomposing said target signal into Fourier components:

$$S(t) = \sum_{i=1}^{N} a_i \sin(\omega_i t + \phi) + b_i \cos(\omega_i t + \phi).$$

13. The highly sensitive, nonlinear target detection method of claim 11 wherein said comparing step further comprises using Bayesian testing.

14. The highly sensitive, nonlinear target detection method of claim 11 wherein said comparing step further comprises using Neyman-Pearson testing.

15. The highly sensitive, nonlinear target detection method of claim 11 wherein said filter step further comprises filtering output of said summing step through a nonlinear filter transformation exhibiting stochastic resonance in its response output.

16. The highly sensitive, nonlinear target detection method of claim 11 wherein said filter step further comprises filtering output of said summing step through a nonlinear filter $\dot{x}=(x)[a+x][a-x]$ where $a>0$.

17. The highly sensitive, nonlinear target detection method of claim 11 wherein said filter step further comprises filtering output of said summing step through a nonlinear filter $\dot{x}=f(x)=-(x+a_1)(x+a_2)(x-a_3)(x-a_4)(x-a_5)$.

18. The highly sensitive, nonlinear target detection method of claim 11 wherein said filter step further comprises filtering output of said summing step through a nonlinear filter $\dot{x}=x-x^3+S(t)+\eta(t)$.

19. The highly sensitive, nonlinear target detection method of claim 11 wherein said providing step further comprises providing a target signal of the sum of two sine waves with unity amplitude and having frequencies of 1 and 4 Hertz $S(t)=\sin(2\pi(1)t)+\sin(2\pi(4)t)$.

20. The highly sensitive, nonlinear target detection method of claim 11 wherein said summing step further comprises summing a noise signal of white Gaussian noise.

* * * * *